United States Patent
Stevelink et al.

(10) Patent No.: US 10,651,635 B2
(45) Date of Patent: May 12, 2020

(54) PANEL FOR ACCOMMODATING A DRAW-OUT DEVICE

(71) Applicant: EATON INTELLIGENT POWER LIMITED, Dublin (IE)

(72) Inventors: Frans Stevelink, Hengelo (NL); Bitao Jin, Suzhou (CN); Zheng Li, Suzhou (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/098,216

(22) PCT Filed: May 5, 2016

(86) PCT No.: PCT/CN2016/081085
§ 371 (c)(1),
(2) Date: Nov. 1, 2018

(87) PCT Pub. No.: WO2017/190301
PCT Pub. Date: Nov. 9, 2017

(65) Prior Publication Data
US 2019/0165553 A1    May 30, 2019

(51) Int. Cl.
*H02B 11/133*    (2006.01)
*H01H 9/20*    (2006.01)
(Continued)

(52) U.S. Cl.
CPC ............. *H02B 11/133* (2013.01); *H01H 9/20* (2013.01); *H01H 9/22* (2013.01); *H02B 11/02* (2013.01);
(Continued)

(58) Field of Classification Search
CPC ... H02B 11/127; H02B 11/133; H02B 11/173; H01H 9/20; H01H 9/22
See application file for complete search history.

(56) References Cited

U.S. PATENT DOCUMENTS 2,558,074 A * 6/1951 Claybourn ............. H01H 33/52
361/616
4,477,701 A   10/1984 Castonguay et al.
(Continued)

FOREIGN PATENT DOCUMENTS

| CN | 2674619 Y | 1/2005 |
| CN | 102227055 A | 10/2011 |
| CN | 102820163 A | 12/2012 |

*Primary Examiner* — Felix O Figueroa
(74) *Attorney, Agent, or Firm* — Leydig, Voit & Mayer, Ltd.

(57) ABSTRACT

A panel for accommodating a draw-out device, such as a vacuum circuit breaker or metering device, includes: a housing with an access opening for accommodating a draw-out device and with primary plugs and secondary plugs connectable to the draw-out device; a traveling system arranged in the housing and for positioning the draw-out device within the housing in a connected position, a service position, and a disconnected position; a door arranged on the housing and movable between a closed position to close the access opening and an open position for provide access to the housing; a primary blocking element for blocking movement of the traveling system from the disconnected position to the service position with the door in the open position or between the open position and the closed position; and a secondary blocking element for blocking the door to move into the closed position with the draw-out device being disconnected.

5 Claims, 3 Drawing Sheets

(51) Int. Cl.
*H02B 11/173* (2006.01)
*H01H 9/22* (2006.01)
*H02B 11/127* (2006.01)
*H02B 11/02* (2006.01)

(52) U.S. Cl.
CPC ......... *H02B 11/127* (2013.01); *H02B 11/173* (2013.01)

(56) References Cited

U.S. PATENT DOCUMENTS

| | | |
|---|---|---|
| 4,743,715 A | 5/1988 | Gerbert-Gaillard |
| 5,424,910 A * | 6/1995 | Lees ..................... H02B 11/00 200/51 R |
| 5,912,444 A | 6/1999 | Godesa |
| 8,319,123 B2 * | 11/2012 | Faulkner .............. H02B 11/127 200/50.21 |

* cited by examiner

US 10,651,635 B2

PANEL FOR ACCOMMODATING A DRAW-OUT DEVICE

CROSS-REFERENCE TO PRIOR APPLICATIONS

This application is a U.S. National Phase application under 35 U.S.C. § 371 of International Application No. PCT/CN2016/081085, filed on May 5, 2016. The International Application was published in English on Nov. 9, 2017 as WO 2017/190301 under PCT Article 21(2).

FIELD

The invention relates to a panel for accommodating a draw-out device, such as a vacuum circuit breaker or a metering device, which panel comprises a housing with an access opening for accommodating a draw-out device and with primary plugs and secondary plugs for the draw-out device to connect to.

BACKGROUND

Such a panel is for example known from U.S. Pat. No. 5,912,444, which discloses an interlock between a door of a housing and a circuit breaker. In this publication a mechanism is explained, which allows for racking the circuit breaker only from the disconnected position into the service position, when the door is closed.

Draw-out devices, such as a vacuum circuit breaker, are typically provided with secondary plugs, which also need to be connected in the panel for a proper functioning of the draw-out device. The secondary plugs could for example provide connections with sensors in the draw-out device for monitoring the status of the draw-out device.

However, known panels, such as described in U.S. Pat. No. 5,912,444, still allow for the draw-out device to be racked into the service position without the secondary plugs being connected. So, the draw-out device can be taken into use, without being properly connected. This is undesired.

SUMMARY

In an embodiment, the present invention provides a panel for accommodating a draw-out device, such as a vacuum circuit breaker or metering device, which panel comprises: a housing with an access opening configured to accommodate a draw-out device and with primary plugs and secondary plugs connectable to the draw-out device; a traveling system arranged in the housing and configured to position the draw-out device within the housing in a connected position, a service position, and a disconnected position; a door arranged on the housing and movable between a closed position to close the access opening of the housing and an open position for provide access to the housing; a primary blocking element configured to block movement of the traveling system from the disconnected position to the service position with the door in the open position or between the open position and the closed position; and a secondary blocking element configured to block the door to move into the closed position with the draw-out device being disconnected from the secondary plugs.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
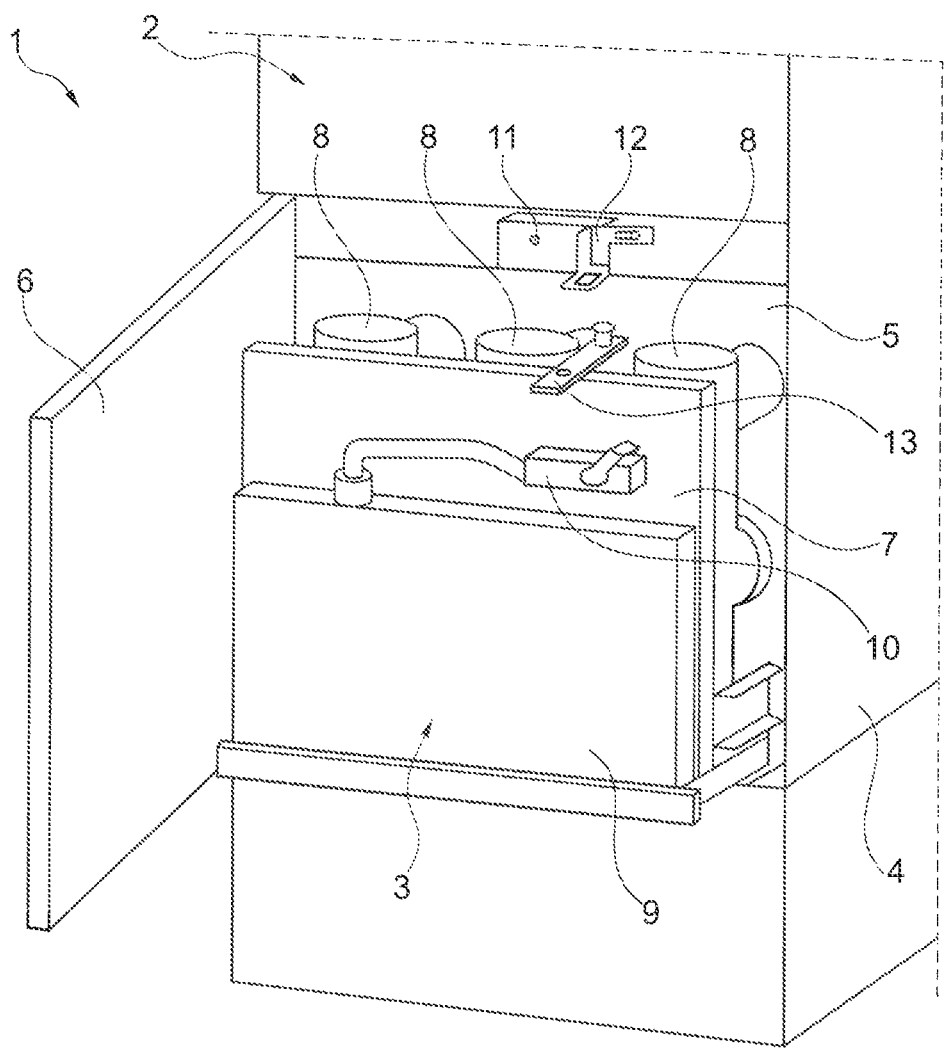
FIG. 1 shows a perspective view of a combination according to the invention.

In an embodiment, the present invention provides a panel for accommodating a draw-out device, such as a vacuum circuit breaker or a metering device, which panel comprises:
- a housing with an access opening for accommodating a draw-out device and with primary plugs and secondary plugs for the draw-out device to connect to;
- a traveling system arranged in the housing for positioning the draw-out device within the housing in a connected position, a service position and a disconnected position;
- a door arranged to the housing movable between a closed position for closing the access opening of the housing and an open position for providing access to the housing; and
- primary blocking means for blocking the movement of the traveling system from the disconnected position to the service position with the door in the open position or between the open position and the closed position.

In an embodiment, the present invention provides a panel characterized by a secondary blocking element for blocking the door to move into the closed position with the draw-out device being disconnected from the secondary plugs.

The secondary blocking element ensures that the door cannot be closed as long as the draw-out device is not connected to the secondary plugs. Because the primary blocking element requires the door to be closed, before the draw-out device can be moved from the disconnected position to the service position, it is ensured that the secondary plugs must be connected before the draw-out device can be moved from the disconnected position to the service position.

In a preferred embodiment of the panel according to the invention the secondary blocking element comprises:
- a cover plate slidable arranged to the housing between a cover position covering at least partially the secondary plugs and a release position releasing the secondary plugs for connection with a plug of the draw-out device;
- a blocking pin movable arranged between a blocking position blocking closure of the door and a pass position for allowing the door to close;
- wherein the movement of the cover plate is coupled to the blocking pin, such that the blocking pin is in the blocking position with the cover plate in the cover position and such that the blocking pin is in the pass position with the cover plate in the release position.

The cover plate is preferably urged towards the cover position.

The cover plate at least partially covers the secondary plugs, such that the cover plate must be slid away to the release position for a plug of a draw-out device to be connected to the secondary plugs.

This movement of the cover plate is coupled to the blocking pin, which blocks the door of being closed in the blocking position and allows the door to be closed in the pass position.

So, only when a secondary plug of a draw-out device is connected to the secondary plugs of the panel, the cover plate will be in the release position and because of the coupling with the blocking pin, this pin is in the pass position allowing the door to be closed.

The invention also relates to a combination of a panel according to the invention and a draw-out device, wherein the blocking pin is provided on a lever pivotably arranged on the draw-out device around a pivot point, wherein furthermore a guide roller is arranged on the lever and wherein the cover plate comprises a guide track for cooperation with the guide roller.

By providing the lever on the draw-out device, the coupling between the cover plate and the blocking pin is only available, when a draw-out device is present in the panel. If the panel is empty, there will be no blocking pin the panel, such that the door can be closed, even when the secondary plugs are not connected.

It is only when a draw-out device is arranged in the panel, that a not complete connection of the draw-out device, in particular not connecting the secondary plugs can occur. As the lever with the blocking pin is arranged on the draw-out device, the coupling between the cover plate and the blocking pin will be available when the draw-out device is arranged in the panel.

The roller on the lever will follow the guide track, when the lever will move relative to the cover plate, when the draw-out device is moved from the disconnected position towards the service position and the connected position. This ensures that independent of the position of the draw-out device in the panel, there is a coupling of the cover plate with the blocking pin.

In a preferred embodiment of the combination according to the invention a spring is arranged on the lever for urging the guide roller in contact with the guide track.

FIG. 1 shows a combination 1 of a panel 2 and a draw-out vacuum circuit breaker 3. The panel 2 has a housing 4 with an access opening 5 through which the vacuum circuit breaker 3 can be inserted into the panel 2. The housing 4 has a door 6 for closing the access opening 5.

The vacuum circuit breaker 3 is provided with a frame 7 on which three vacuum interrupters 8 are provided and a control circuit 9 provided with a cable with a secondary plug connector 10.

Within the panel 2 primary plugs are provided for connection with the vacuum interrupters 8 and secondary plugs 11 for connection with the secondary plug connector 10 of the vacuum circuit breaker 3.

A cover plate 12 partially covers the secondary plugs 11 and a lever 13 is pivotably arranged on the frame 7 of the vacuum circuit breaker 3.

Figure 2:
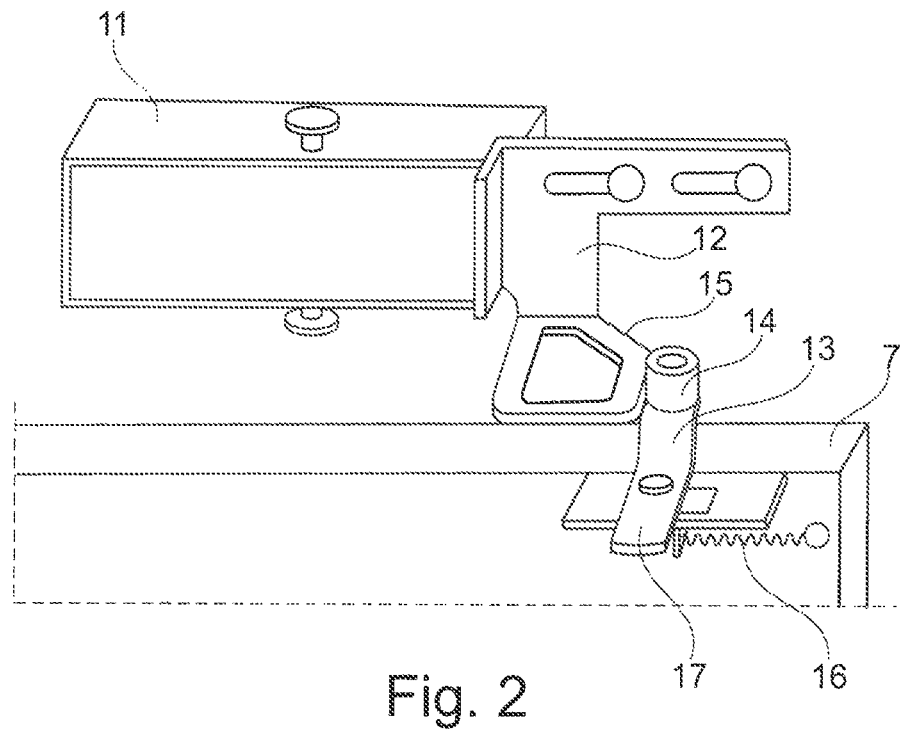
FIG. 2 shows a more detailed perspective view of the secondary blocking element of the combination of FIG. 1 in a blocking position.
Figure 3:
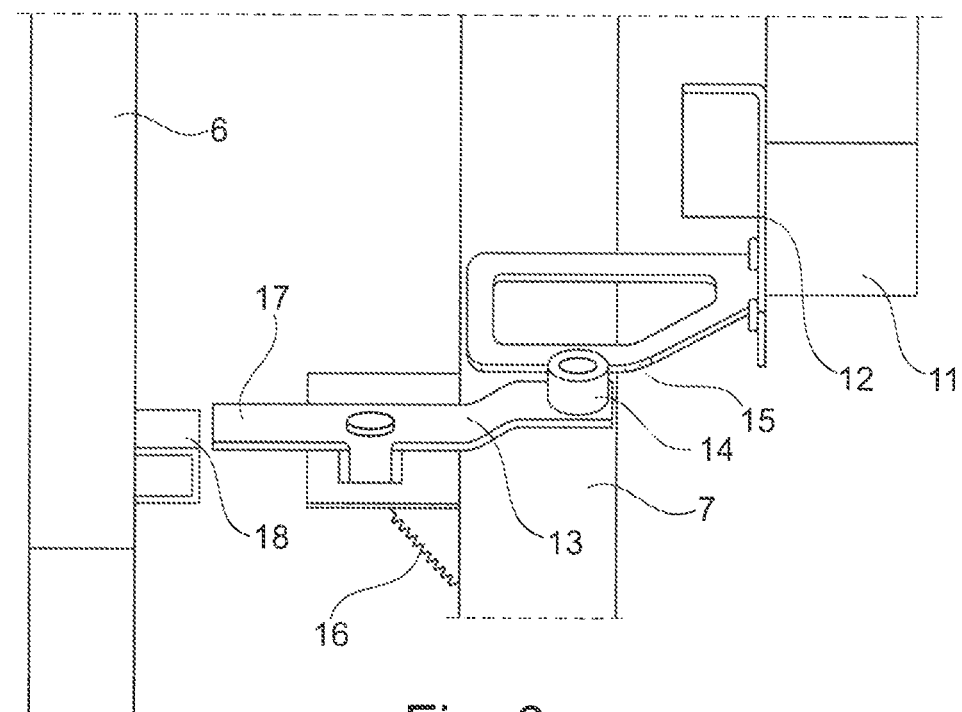
FIG. 3 shows a top view of the position shown in FIG. 2.

FIG. 2 shows the position in which the vacuum circuit breaker 3 is moved further into the panel 2 and the door 6 could generally be closed.

In this position, a guide roller 14 arranged on the lever 13 is in contact with a guide track 15 arranged on the cover plate 12, which partially covers the secondary plugs 11. A spring 16 is arranged between the lever 13 and the frame 7, such that the guide roller 14 is urged against the guide track 15.

The free end of the lever 13 forms a blocking pin 17, which comes into contact with a protrusion 18 on the door 6 and prevents the door 6 from fully closing. Due to the generally known primary blocking element, the vacuum circuit breaker 3 cannot be moved further into the panel 2 as long as the door 6 is not fully closed.

Figure 4:
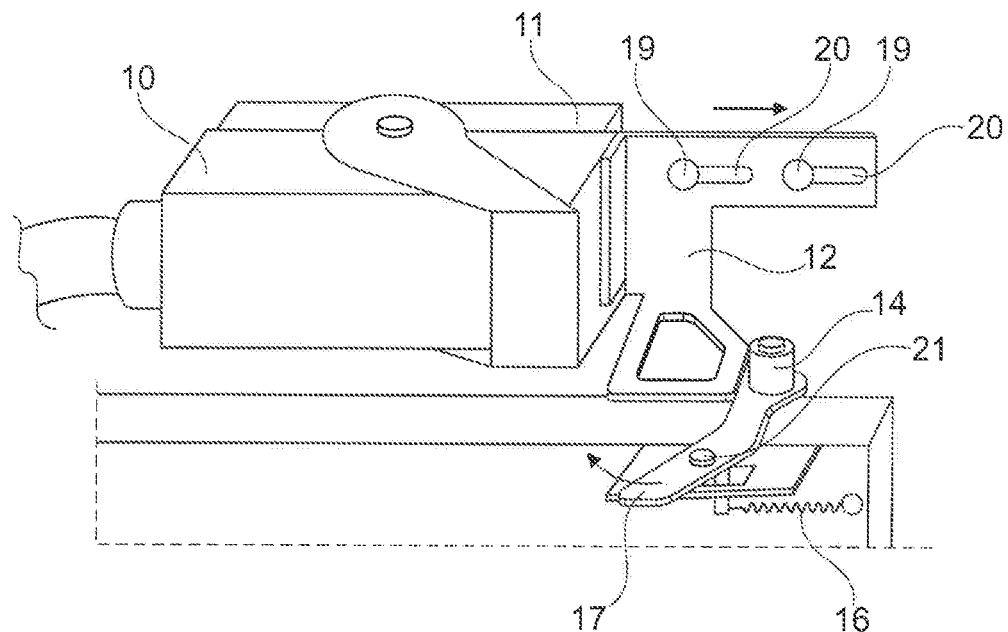
FIG. 4 shows a more detailed perspective view of the secondary blocking element of the combination of FIG. 1 in a pass position.
Figure 5:
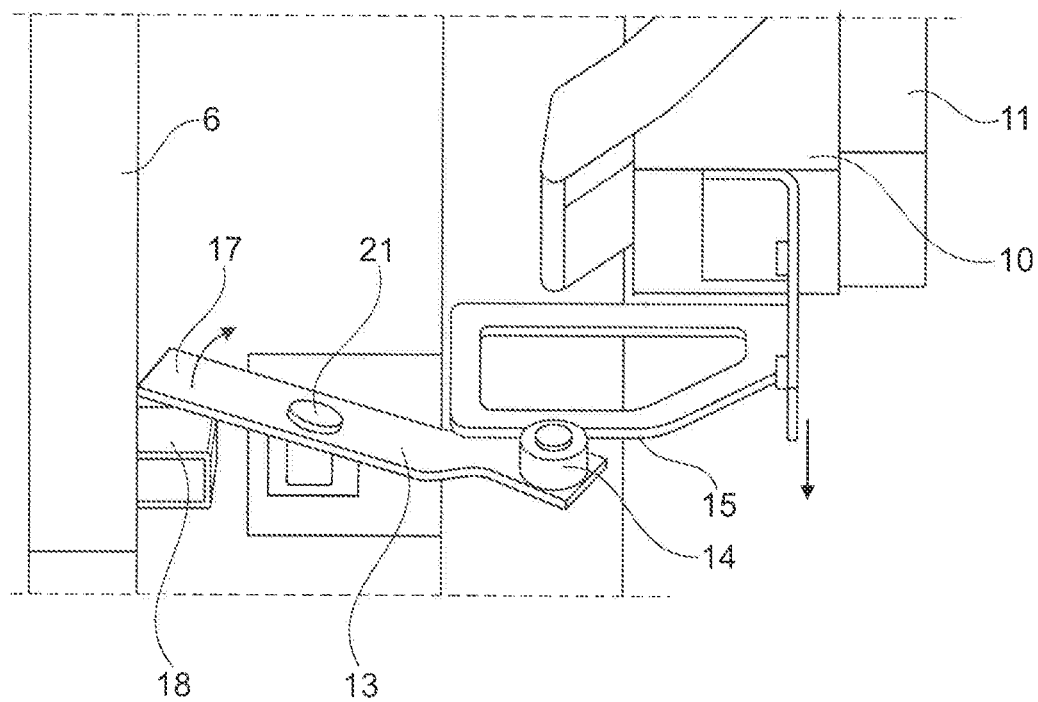
FIG. 5 shows a top view of the position shown in FIG. 4.

In FIG. 4 the secondary plug connector 10 is connected to the secondary plugs 11. To provide access to the secondary plugs 11, the cover plate 12 is slid along the mounting pins 19 via the slots 20 in the cover plate 12.

As a result of bringing the cover plate 12 from the cover position (as shown in FIG. 2) to the release position (as shown in FIG. 4), the guide track 15 will move the guide roller 14 and accordingly the lever 13 around the rotation pin 21. This causes the blocking pin 17 to move out of contact with the protrusion 18 allowing the door 6 to be fully closed.

After the door 6 is fully closed, the vacuum circuit breaker 3 can move along a traveling system further into the panel 2 to arrive at a service position and a connected position. With this movement, the guide roller 14 will move along the guide track 15 ensuring that the blocking pin 17 remains out of contact with the protrusion 18 on the door 6.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A panel for accommodating a draw-out device, such as a vacuum circuit breaker or metering device, which panel comprises:

a housing with an access opening configured to accommodate a draw-out device and with primary plugs and secondary plugs connectable to the draw-out device;

a traveling system arranged in the housing and configured to position the draw-out device within the housing in a connected position, a service position, and a disconnected position;

a door arranged on the housing and movable between a closed position to close the access opening of the housing and an open position to open the access opening of the housing;

a primary blocking element configured to block movement of the traveling system from the disconnected position to the service position with the door in the open position or between the open position and the closed position; and a secondary blocking element configured to block the door from moving into the closed position with the draw-out device being disconnected from the secondary plugs, wherein the secondary blocking element comprises:

a cover plate slidably arranged on the housing between a cover position covering at least partially the secondary plugs and a release position uncovering the secondary plugs for connection with a plug of the draw-out device; and a blocking pin movably arranged between a blocking position blocking closure of the door and a pass position for allowing the door to close, wherein movement of the cover plate is coupled to the blocking pin, such that the blocking pin is in the blocking position with the cover plate in the cover position and such that the blocking pin is in the pass position with the cover plate in the release position.

2. The panel according to claim 1, wherein the blocking pin is provided on a lever pivotably arranged on the draw-out device around a pivot point, wherein a guide roller is arranged on the lever, and wherein the cover plate comprises a guide track configured to cooperate with the guide roller.

3. The panel according to claim 2, further comprising a spring arranged on the lever, the spring being configured to urge the guide roller into contact with the guide track.

4. A combination, comprising:

a draw-out device; and a panel for accommodating the draw-out device, which panel comprises:

a housing with an access opening configured to accommodate the draw-out device and with primary plugs and secondary plugs connectable to the draw-out device;

a traveling system arranged in the housing and configured to position the draw-out device within the housing in a connected position, a service position, and a disconnected position;

a door arranged on the housing and movable between a closed position to close the access opening of the housing and an open position to open the access opening of the housing;

a primary blocking element configured to block movement of the traveling system from the disconnected position to the service position with the door in the open position or between the open position and the closed position; and a secondary blocking element configured to block the door from moving into the closed position with the draw-out device being disconnected from the secondary plugs wherein the secondary blocking element comprises:

a cover plate slidably arranged on the housing between a cover position covering at least partially the secondary plugs and a release position uncovering the secondary plugs for connection with a plug of the draw-out device;

a blocking pin movably arranged between a blocking position blocking closure of the door and a pass position for allowing the door to close, wherein movement of the cover plate is coupled to the blocking pin, such that the blocking pin is in the blocking position with the cover plate in the cover position and such that the blocking pin is in the pass position with the cover plate in the release position, wherein the blocking pin is provided on a lever pivotably arranged on the draw-out device around a pivot point, wherein a guide roller is arranged on the lever, and wherein the cover plate comprises a guide track configured to cooperate with the guide roller.

5. The combination according to claim 4, further comprising a spring arranged on the lever, the spring being configured to urge the guide roller into contact with the guide track.

* * * * *